2,996,488
NEW HYDROCARBON MONOMERS AND POLYMERS AND PREPARATION OF SAME

Alfred J. Mital, Brecksville, and John F. Jones, Cuyahoga Falls, Ohio, assignors to The B. F. Goodrich Company, New York, N.Y., a corporation of New York
No Drawing. Filed Nov. 21, 1958, Ser. No. 775,387
15 Claims. (Cl. 260—88.1)

This invention relates to polyunsaturated hydrocarbons, their polymers and method of preparation and more specifically pertains to terminally unsaturated polyalkenyl methane, polymers thereof, and methods for preparing same.

It is an object of this invention to provide a new class of vinyl monomers of the terminally unsaturated polyalkenyl methane type and method for their preparation. Another object of this invention is the provision of homopolymers of said terminally unsaturated polyalkenyl methanes and methods for preparation of said homopolymers. It is yet another object of this invention to provide cross-linked interpolymers of said terminally unsaturated polyalkenyl methanes with other vinyl monomers and the methods for preparing said interpolymers.

The term "terminally unsaturated polyalkenyl methanes" 'as used in this invention is defined to include the new class of hydrocarbon monomers conforming to the structure

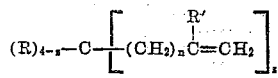

wherein $n$ is a whole number of from 1 to 6, R is $CH_2OH$, $CH_2X$ and wherein X is a halogen of atomic weight greater than 19, R' is hydrogen and an alkyl group having from 1 to 2 carbon atoms and $z$ is a number of from 3 to 4 inclusive, such compounds including tetraallyl methane, tetrabutenyl methane, tetrapentenyl methane, tetrahexenyl methane, tetraheptenyl methane, tetraoctenyl methanes, tetramethallyl methane, 1,1,1-triallyl ethanol, 1,1,1-triallyl ethyl bromide, 1,1,1-triallyl bromomethane and the like and others and mixtures thereof.

The terminally unsaturated polyalkenyl methanes embodied in this invention are most conveniently prepared by the reaction of a pentaerythrityl halide or a tetrahalomethane with an alkenyl Grignard reagent in the following manner:

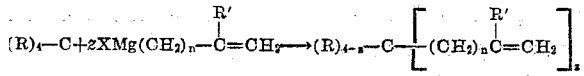

wherein $n$, R, R', X and $z$ have the same designation as above. As a specific illustration of this reaction tetraallyl methane is prepared by the reaction of at least four moles of vinyl magnesium chloride or vinyl magnesium bromide with one mole of pentaerythrityl bromide in an ether solvent. Tetraallyl methane can also be prepared, for example, by the reaction of at least four moles of allyl magnesium bromide or allyl magnesium chloride with one mole of carbon tetrabromide. The crude products of these syntheses are often complex mixtures of alkenes which are difficult to separate. Analysis of such materials, therefore, generally reveals only the average number of alkenyl groupings on each molecule.

The terminally unsaturated polyalkenyl methanes of his invention are useful as chemical intermediates and as vinyl monomers for homopolymerization to hard products having excellent heat stability and they are especially useful as cross-linking comonomers with other vinyl monomers. When copolymerized with other vinyl monomers the terminally unsaturated polyalkenyl methanes impart infusibility and insolubility to the resulting interpolymers. When the terminally unsaturated polyalkenyl methanes of this invention are copolymerized with carboxylic vinyl monomers, interpolymers result which range in properties from high-swelling, water-sensitive polymeric thickening agents useful as bodying and suspending agents in various mucilaginous or colloidal gel-like applications such as furniture polishes, auto polishes, hair styling creams, dentifrices, ointments and thickened printing pastes; to water-insoluble, resinous cation exchange resins depending upon the proportion of terminally unsaturated polyalkenyl methane used in the polymerization recipe. Generally, levels of from 0.001 to about 5% by weight of terminally unsaturated polyalkenyl methane based on the weight of other monomers in a carboxylic polymer recipe produces the best range of water-sensitive thickeners and levels of from 5 to 20% by weight of the terminally unsaturated polyalkenyl methane in the polymerization recipe produces insoluble, infusible cation exchange resins.

The homopolymers of the terminally unsaturated polyalkenyl methanes of this invention may be prepared in bulk, in emulsion or in solution systems with free-radical initiators such as benzoyl peroxide, cumene hydroperoxide, caprylyl peroxide, persulfates, redox catalysts and azo-bis-isobutyronitrile.

The terminally unsaturated polyalkenyl methanes can be heteropolymerized to high molecular weight and high melting polymeric products in bulk, emulsion or solution systems in the presence of a free-radical catalyst with at least one of the following types of vinyl monomers: alpha,beta-olefinically unsaturated carboxylic acids and their anhydrides including acrylic acid, methacrylic acid, ethacrylic acid, alpha-chloroacrylic acid, alpha-bromoacrylic acid, alpha-fluoroacrylic acid, alpha-cyanoacrylic acid, maleic anhydride, alpha-chloromaleic anhydride, dichloromaleic anhydride, itaconic acid, sorbic acid, and the like; acrylic esters such as methyl acrylate, ethyl acrylate, the propyl acrylates, the butyl acrylates, the amyl acrylates, the hexyl acrylates, cyclohexyl acrylate, phenyl acrylate, the heptyl acrylates, the octyl acrylates, the nonyl acrylates, the decyl acrylates, the undecyl acrylates and the dodecyl acrylates, the alpha-chloroacrylates, the alpha-fluoroacrylates, the alpha-bromoacrylates, the alpha-cyanoacrylates, methyl methacrylate, ethyl methacrylate, the proply methacrylates, the butyl methacrylates, the amyl methacrylates, the hexyl methacrylates, cyclohexyl methacrylate, phenyl methacrylate, the heptyl methacrylates, the octyl methacrylates, the nonyl methacrylates, the decyl methacrylates, the undecyl methacrylates and the dodecyl methacrylates and the like and others; the vinyl esters such as vinyl acetate, vinyl propionate, vinyl butyrates, isopropenyl acetate, isopropenyl propionate, the isopropenyl butyrates and the like; the vinyl ethers such as methyl vinyl ether, the propyl vinyl ethers, the butyl vinyl ethers, the amyl vinyl ethers, the hexyl vinyl ethers, cyclohexyl vinyl ether, phenyl vinyl ether, the heptyl vinyl ethers and the octyl vinyl ethers and the like; the vinyl halides such as vinyl chloride, vinyl fluoride, vinyl bromide, vinylidene chloride, vinylidene bromide, vinylidene fluoride, dichlorodifluoroethylene, chlorotrifluoroethylene, trifluoroethylene, chloroprene, and the like; olefins such as ethylene, propylene, butylenes, amylenes, hexylenes, heptylenes, octylenes, butadiene, styrene, alpha-methyl styrene, alpha-chlorostyrene and the like; vinyl cyanides such as acrylonitrile, methacrylonitrile, maleic dinitrile, fumaronitrile, vinylidene cyanide and the like; vinyl amides such as acrylamide, N-methyl acrylamide, N-methyl methacrylamide, N,N-dimethyl acrylamide, N,N-dimethyl methacrylamide, N-t-butyl acrylamide, N-dodecyl acrylamide, N-phenyl acrylamide, N-methylol acrylamide, N-vinyl pyrrolidone, and the like; vinyl amines such as N-vinyl piperidine, the vinyl pyridines and the like; the allyl esters such as allyl acetate, allyl propionate, allyl butyrate, methallyl acetate, methallyl propionate, and methallyl butyrate and the like and others.

The following examples are specific illustrations and not limitations on the scope of this invention. The quantities of ingredients used in the following examples are given in parts by weight unless otherwise noted. The viscosities of the aqueous polymer mucilages were all determined at a pH of approximately 7 with a Brookfield viscometer and the values are expressed in centipoises.

*Example I*

Pentaerythrityl tetrabromide was prepared by the method described in *Organic Synthesis, Collective Volume I*, page 476. Vinyl magnesium chloride was made by the addition of 125 g. of vinyl chloride to 48.6 g. of freshly turned magnesium in tetrahydrofuran while observing the usual precautions necessary in Grignard reactions. The vinyl magnesium chloride solution was decanted from the excess magnesium and was cooled to 6° C. A solution of 95 g. of pentaerythrityl bromide in 400 ml. of tetrahydrofuran was added to the cooled Grignard solution and the reaction temperature was maintained at 50° C. by controlled addition of the pentaerythrityl bromide solution. The resulting dark solution was refluxed for seven hours. Three hundred ml. of distilled water were added to the mixture at a temperature below 20° C. The reaction mixture was finally treated with 225 ml. of 25% hydrochloric acid. The upper layer was isolated and dried over anhydrous sodium sulfate. The tetrahydrofuran was removed from the dried organic layer by atmospheric pressure distillation and the impure tetraallyl methane was recovered at 25° C. and 5 mm.

*Example II*

Allyl magnesium bromide was prepared in a standard Grignard reactor from 302.5 g. of allyl bromide, 750 ml. of anhydrous diethyl ether and 72 g. of fresh magnesium turnings. The ethereal Grignard solution was decanted from excess magnesium and was placed in a 3 l. glass flask. A solution of 142 g. of pentaerythrityl bromide in 400 ml. of tetrahydrofuran was added dropwise to the cooled stirred allyl magnesium bromide solution. The ether was removed by distillation and 880 ml. of tetrahydrofuran was added and the mixture was refluxed for a few hours. The reaction mixture was cooled and 175 ml. of distilled water was added dropwise to the reaction mixture and this was followed by the addition of 200 ml. of 20% hydrochloric acid. The organic layer was isolated and dried over anhydrous sodium sulfate for 4 hours. The tetrahydrofuran was removed by distillation at atmospheric pressure. The distillation pot was then cooled and the solid precipitate was removed by filtration. The filtrate was distilled at reduced pressure through a short column. The main fraction was collected at about 80° C. and 10 mm. A smaller fraction was collected at 90–95° C. and 2 mm. The 80° C./10 mm. fraction of tetrabutenyl methane was found to have an iodine number of 330.6. The calculated iodine number for tetrabutenyl methane is 436.9 which means this sample contained an average of slightly more than 3 butenyl groups per molecule. This sample was used in some of the following examples.

*Example III*

A series of polymers were prepared from the following recipes at 50° C. in a nitrogen atmosphere:

|  | A | B | C | D |
|---|---|---|---|---|
| Glacial acrylic acid | 100 | 100 | 100 | 100 |
| Tetraallyl methane | 0.25 | 0.5 | 1.0 | 1.5 |
| Benzoyl peroxide | 1.0 | 1.0 | 1.0 | 1.0 |
| Benzene | 880 | 880 | 880 | 880 |

High conversions were realized in 8 hours. The polymers were isolated by filtration followed by drying at 50° C. Aqueous mucilages were made by adding 1.5 g. of polymer and 10 ml. of 5% aqueous NaOH solution to 90 ml. of distilled water.

| Polymer Conc., percent | Viscosities | | | |
|---|---|---|---|---|
| | A | B | C | D |
| 1.5 | 320 | 7,200 | 16,400 | 18,400 |
| 1.0 | 140 | 1,800 | 8,600 | 10,400 |
| 0.25 | 40 | 220 | 1,200 | 2,320 |
| 0.062 | 20 | 80 | 440 | 1,000 |
| 0.015 | 0 | 0 | 160 | 440 |

Acrylic acid-tetraallyl methane and methacrylic acid-tetraallyl methane copolymers containing 10 and 15 parts of tetraallyl methane were prepared in the above manner and they were found to be resinous, water-insoluble polymers useful as cation exchange resins. A mixture of 80 g. of the 0.25% mucilage of B alone and 20 g. of titanium dioxide was homogenized and allowed to age at room temperature for a month. No settling of the titanium dioxide was observed at the end of the aging period.

*Example IV*

A series of acrylic acid/tetrabutenyl methane copolymers were made at 50° C. in a nitrogen atmosphere from the following recipes:

|  | A | B | C | D | E | F |
|---|---|---|---|---|---|---|
| Glacial acrylic acid | 100 | 100 | 100 | 100 | 100 | 100 |
| Tetrabutenyl methane | 0.25 | 0.5 | 1.0 | 1.5 | 2.5 | 3.75 |
| Benzoyl peroxide | 1.0 | 1.0 | 1.0 | 1.0 | 1.0 | 1.0 |
| Benzene | 880 | 880 | 880 | 880 | 880 | 880 |

Polymerizations were complete in 8 hours. Aqueous mucilages were prepared as described in Example III.

| Polymer Conc., percent | Viscosities | | | | | |
|---|---|---|---|---|---|---|
| | A | B | C | D | E | F |
| 1.5 | 220 | 220 | 180 | 560 | 460 | 8,800 |
| 1.0 | 120 | 140 | 100 | 300 | 260 | 3,200 |
| 0.5 | 60 | 80 | 60 | 160 | 140 | 720 |
| 0.125 | 20 | 20 | 20 | 40 | 40 | 220 |

Excellent sand suspensions were made with the 1.5% mucilage of polymer F.

*Example V*

A series of acrylonitrile-polyallyl methane copolymers were prepared from the following recipe:

Demineralized water _____ grams __ 392
Acrylonitrile _____ do ____ 40
Tetraallyl methane _____ Variable
5% potassium persulfate solution _____ cc ____ 8
10% sodium bisulfite solution _____ cc ____ 1.5

Gels of the above polymers were prepared in dimethyl formamide and the viscosities were determined.

| Percent Tetraallyl Methane in Polymer | Viscosities, 3% Polymer in Dimethyl Formamide |
|---|---|
| 0.1 | 20,200 |
| 0.3 | 21,200 |
| 0.6 | 11,400 |
| 1.2 | 270 |

The thickened dimethyl formamide prepared with the acrylonitrile-0.3 part tetraallyl methane copolymer was an excellent paint remover, especially for vertical and overhead painted surfaces.

Example VI

Allyl magnesium bromide was prepared as described in Example II from 109.5 g. of magnesium turnings, 750 ml. of anhydrous diethyl ether and 142 ml. of allyl bromide. The allyl magnesium bromide was decanted from the residual magnesium and it was added slowly to a solution of 100 g. of carbon tetrabromide in 100 ml. of anhydrous diethyl ether. The ether was then distilled from the reaction mixture simultaneously with the addition of about 750 ml. of benzene. The resulting mixture was maintained at 60° C. for 2 hours followed by cooling to room temperature. The contents of the reactor at this point had the color of creamed coffee.

The reaction mixture was treated with 100 ml. of water followed by 280 ml. of 20% hydrochloric acid. The layers were separated and the organic layer was dried for a day over anhydrous sodium sulfate. The solvent was then removed by distillation at atmospheric pressure through a 10 inch column packed with Berl saddles. The product, crude tetraallyl methane, was collected at 76–78° C. and 9 mm.

Example VII

The crude tetraallyl methane described in Example VI was copolymerized with glacial acrylic acid by the procedure described in Example III employing the following recipes:

|  | A | B | C | D |
|---|---|---|---|---|
| Glacial acrylic acid | 100 | 100 | 100 | 100 |
| Tetraallyl methane | 0.5 | 1.0 | 1.5 | 2.0 |
| Benzoyl peroxide | 2.0 | 2.0 | 2.0 | 2.0 |
| Benzene | 880 | 880 | 880 | 880 |

High conversions were obtained in 8 hours. The polymers were isolated by filtration followed by drying at 50° C. Aqueous mucilages were prepared by adding 1.5 g. of polymer and 10 ml. of 5% aqueous sodium hydroxide solution to 90 ml. of distilled water.

| Polymer Conc., percent | Viscosities | | | |
|---|---|---|---|---|
|  | A | B | C | D |
| 1.5 | 1,140 | 11,800 | 13,800 | 18,400 |
| 1.0 | 600 | 7,000 | 9,000 | 11,000 |
| 0.25 | 120 | 800 | 1,940 | 2,480 |
| 0.125 | 80 | 500 | 1,080 | 1,600 |

The polymers described in this example are comparable to those described in Example III.

Interpolymers of equimolar weights of maleic anhydride and methyl vinyl ether and varying amounts of tetraallyl methane were prepared. The polymers prepared with from 0.1 to 5 parts tetraallyl methane were found to be excellent thickeners for water at pH's of from about 5 to 8.

The above examples are illustrative of the spirit and scope of this invention which is fully defined in the appended claims.

We claim:

1. The composition having the structure

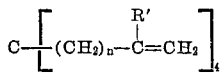

wherein $n$ is a whole number of from 1 to 6 and $R'$ is a member of the group consisting of hydrogen and an alkyl group having from 1 to 2 carbon atoms.

2. Tetraallyl methane having the formula $$(CH_2=CHCH_2)_4C$$

3. Tetrabutenyl methane having the formula $$(CH_2=CHCH_2CH_2)_4C$$

4. The composition comprising the resinous copolymer of an alpha, beta-olefinically unsaturated carboxylic acid and from about 0.001 to about 5% by weight based on the weight of said acid of a monomer having the structure

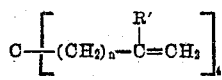

wherein $n$ is a whole number of from 1 to 6 and $R'$ is a member of the group consisting of hydrogen and an alkyl group having from 3 to 4 carbon atoms.

5. The composition comprising the resinous copolymer of an alpha, beta-olefinically unsaturated carboxylic acid having from 3 to 4 carbon atoms and from about 0.001 to about 5% by weight of said acid of tetraallyl methane.

6. The composition comprising the resinous copolymer of an alpha, beta-olefinically unsaturated carboxylic acid having from 3 to 4 carbon atoms and from about 0.001 to about 5% by weight of said acid of tetrabutenyl methane.

7. The composition comprising the resinous copolymer of acrylic acid and from about 0.001 to about 5% by weight of said acid of tetraallyl methane.

8. The composition comprising the resinous copolymer of acrylic acid and from about 0.001 to about 5% by weight of said acid of tetrabutenyl methane.

9. The method for preparing compounds having the structure

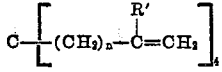

wherein $n$ is a whole number of from 1 to 6 and $R'$ is a member of the group consisting of hydrogen and an alkyl group having from 1 to 2 carbon atoms said method comprising reacting in an ether solvent at about reflux temperature a Grignard reagent having the structure

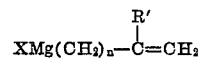

with an alkyl halide having the structure $(R)_4$—C wherein $n$ is a whole number of from 1 to 6, R is a member of the group consisting of —$CH_2X$ and X wherein X represents a halogen of atomic number greater than 19 and $R'$ has the aforementioned designation.

10. The method of preparing tetraallyl methane conforming to the structure $$(CH_2=CHCH_2)_4\text{—}C$$

comprising reacting in an ether solvent at about reflux temperature about one mole of pentaerythrityl tetrabromide with about four moles of vinyl magnesium chloride.

11. The method for preparing tetrabutenyl methane conforming to the structure $$(CH_2=CH\text{—}CH_2CH_2)_4\text{—}C$$

comprising reacting in an ether solvent at about reflux temperature about one mole of pentaerythrityl tetrabromide with about four moles of allyl magnesium bromide.

12. The method for preparing tetraallyl methane comprising reacting in an ether solvent at about reflux temperature about one mole of carbon tetrabromide with about four moles of allyl magnesium bromide.

13. The method for preparing the resinous copolymer of an alpha, beta-olefinically unsaturated carboxylic acid and from about 0.001 to about 5% by weight based on said acid of a monomer having the structure

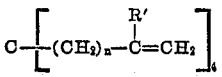

wherein $n$ is a whole number of from 1 to 6 and R' is a member of the group consisting of hydrogen and an alkyl group having from 1 to 2 carbon atoms, said method comprising copolymerizing said acid and said polyalkenyl methane in an inert organic diluent at a temperature of from about 40° C. to about 80° C. in the presence of a free radical initiator.

14. The method of claim 13 wherein the inert organic diluent is benzene.

15. The method of claim 13 wherein the free-radical initiator is benzoyl peroxide.

References Cited in the file of this patent

UNITED STATES PATENTS

| 2,542,551 | McKeever | Feb. 20, 1951 |
| 2,798,053 | Brown | July 2, 1957 |
| 2,810,716 | Markus | Oct. 22, 1957 |

OTHER REFERENCES

Shell Chem. Corp., Allyl Chloride and Other Allyl Halides, Tech. Publ., S.C. 49–8, Stein & Co. (1949), pp. 11, 12, 52, 60–64, 69, 71, 72, 74 and 75.

Chem. Abstracts, vol. 44, 1888C (1950).

UNITED STATES PATENT OFFICE

CERTIFICATE OF CORRECTION

Patent No. 2,996,488                         August 15, 1961

Alfred J. Mital et al.

It is hereby certified that error appears in the above numbered patent requiring correction and that the said Letters Patent should read as corrected below.

Column 3, line 30, for "25%" read -- 20% --; column 6, line 48, for "of" read -- for --.

Signed and sealed this 12th day of June 1962.

(SEAL)
Attest:

ERNEST W. SWIDER
Attesting Officer

DAVID L. LADD
Commissioner of Patents